United States Patent [19]

Breant et al.

[11] Patent Number: 5,731,092
[45] Date of Patent: Mar. 24, 1998

[54] PACKAGING MATERIAL COMPRISING A SILICON OXIDE LAYER AND A POLYOLEFIN LAYER

[75] Inventors: Patrice Breant, Serquigny; Philippe Tordjeman, Billere, both of France

[73] Assignee: Elf Atochem S.A., Puteaux, France

[21] Appl. No.: 604,962

[22] PCT Filed: Jun. 28, 1995

[86] PCT No.: PCT/FR95/00860

§ 371 Date: Feb. 27, 1996

§ 102(e) Date: Feb. 27, 1996

[87] PCT Pub. No.: WO96/00656

PCT Pub. Date: Jan. 11, 1996

[30] Foreign Application Priority Data

Jun. 30, 1994 [FR] France ................. 94 08090

[51] Int. Cl.[6] .................. B32B 27/30; B32B 27/32; B32B 27/36
[52] U.S. Cl. .................. 428/448; 428/451; 428/480; 428/520
[58] Field of Search .................. 428/446, 451, 428/480, 520, 448

[56] References Cited

U.S. PATENT DOCUMENTS

| | | | |
|---|---|---|---|
| 3,306,800 | 2/1967 | Plueddemann | 156/329 |
| 4,364,731 | 12/1982 | Norling et al. | 433/218 |
| 5,458,980 | 10/1995 | Larson | 428/447 |

FOREIGN PATENT DOCUMENTS

| | | |
|---|---|---|
| 663031 | 10/1965 | Belgium. |
| 0 249 442 | 12/1987 | European Pat. Off.. |
| 25 30 726 | 1/1977 | Germany. |
| 5-330568 | 12/1993 | Japan. |

OTHER PUBLICATIONS

Abstract in English of JP-A-05 330 568, Dec. 14, 1993, see Derwent 94-022559 (03) to Yamato Estron KK.

*Primary Examiner*—D. S. Nakarani
*Attorney, Agent, or Firm*—Pennie & Edmonds LLP

[57] ABSTRACT

A material useful for manufacturing food packagings is formed from a film covered with silicon oxide and a polyolefin film, such that the binder arranged between the film covered with silicon oxide and the polyolefin film is selected from the group consisting of polyolefins grafted with unsaturated alkoxysilanes, polyolefins grafted with unsaturated epoxides, and copolymers of ethylene with at least one unsaturated epoxide.

12 Claims, No Drawings

5,731,092

PACKAGING MATERIAL COMPRISING A SILICON OXIDE LAYER AND A POLYOLEFIN LAYER

DESCRIPTION

The present invention relates to a packaging material comprising a silicon oxide layer and a polyolefin layer.

It more particularly relates to a structure comprising a film covered with silicon oxide and a polyolefin film, an adhesive binder being arranged between the silicon oxide and the polyolefin film. It is possible, for example, as regards the polyolefin film, to hot-bond this material to cardboard and then to cover each face of the combined unit obtained with a polyethylene sheet.

These materials are useful for manufacturing packagings for liquid foodstuffs in the form of cartons.

JP 03099842 (Kokai), published on 25 Apr. 1991, describes EVOH/vinylsilane films covered with silicon oxide, on which films is bonded a polypropylene sheet using a urethane adhesive.

JP 05330568 (Kokai), published on 14 Dec. 1993, describes polyester, films covered with silica, on which films is bonded a sheet of ethylenic resin using an adhesive which is an ethylene-maleic anhydride-ethyl acrylate copolymer.

It has now been found that it is possible to obtain materials which cannot be delaminated, by using binders based on polyolefins grafted with silanes or epoxides.

The present invention is a material comprising a film covered with silicon oxide and a polyolefin film such that the binder arranged between the silicon oxide and the polyolefin film is chosen from:

polyolefins grafted with unsaturated alkoxysilanes,
or
polyolefins grafted with unsaturated epoxides,
or
copolymers of ethylene and of at least one unsaturated epoxide.

The film covered with silicon oxide is known in the prior art. It is, for example, a film of polyester such as poly (ethylene terephthalate) (PET) or poly(butylene terephthalate) (PBT) or polyamide (PA).

The polyolefin film is made of polyethylene, polypropylene or copolymers of ethylene, such as, for example, ethylene-propylene, ethylene-butene, ethylene-hexene, ethylene-alkyl (meth)acrylate or ethylene-vinyl acetate copolymers.

As regards the binder, the polyolefins which are grafted with alkoxysilanes can be chosen from:

homopolymers of ethylene or of propylene;
copolymers of ethylene and of vinyl acetate;
copolymers of ethylene and of at least one alkyl (meth) acrylate. The alkyl group of the alkyl (meth)acrylate has up to 10 carbon atoms and can be linear, branched or cyclic. Mention may be made, by way of illustration of the alkyl (meth)acrylate, of in particular n-butyl acrylate, methyl acrylate, isobutyl acrylate, 2-ethylhexyl acrylate, cyclohexyl acrylate, methyl methacrylate or ethyl methacrylate. Preference is given, among these (meth)acrylates, to ethyl acrylate, methyl acrylate, n-butyl acrylate and methyl methacrylate;
copolymers of ethylene and of an alpha-olefin such as butene or hexene;
amorphous poly(alpha-olefin)s (APAO). Use is preferably made of the APAOs derived from ethylene, propylene, butene or hexene. Use is advantageously made either of ethylene-propylene-butene copolymers with a high butene content or of ethylene-propylene-butene copolymers with a high propylene content or of homo- or copolymers of butene.

Use is advantageously made of ethylene-alkyl (meth) acrylate copolymers.

Mention may be made, among alkoxysilanes carrying an unsaturation, of:

$CH_2=CH-Si(OR)_3$ vinyltrialkoxysilanes $CH_2=CH-CH_2-Si(OR)_3$ allyltrialkoxysilanes $CH_2=CR_1-CO-O-Y-Si(OR)_3$ (meth)acryloxyalkyltrialkoxysilanes (or (meth) acrylsilanes) in which:

R is an alkyl having from 1 to 5 carbon atoms or an alkoxy $-R_2OR_3$ in which $R_2$ and $R_3$ are alkyls having at most 5 carbon atoms for the combined unit $R_2$ and $R_3$;

$R_1$ is a hydrogen or methyl;

Y is an alkylene having from 1 to 5 carbon atoms.

Use is made, for example, of vinylsilanes, such as trimethoxyvinylsilane, triethoxyvinylsilane, tripropoxyvinylsilane, tributoxyvinylsilane, tripentoxyvinylsilane or tris(β-methoxyethoxy)vinylsilane, allylsilanes, such as trimethoxyallylsilane, triethoxyallylsilane, tripropoxyallylsilane, tributoxyallylsilane or tripentoxyallylsilane, or acrylsilanes, such as acryloxymethyltrimethoxysilane, methacryloxymethylmethoxysilane, acryloxyethyltrimethoxysilane, methacryloxyethyltrimethoxysilane, acryloxypropyltrimethoxysilane, methacryloxypropyltrimethoxysilane, acryloxybutyltrimethoxysilane, methacryloxybutylmethoxysilane, acryloxyethyltriethoxysilane, methacryloxyethyltriethoxysilane, methacryloxyethyltripropoxysilane, acryloxypropyltributoxysilane or methacryloxypropyltripentoxysilane.

It is also possible to use mixtures of these products.

Use is preferably made of:

$CH_2=CH-Si-(OCH_3)_3$ vinyltrimethoxysilane (VTMO)

$CH_2=CH-Si-(OCH_2CH_3)_3$ vinyltriethoxysilane (VTEO)

$CH_2=CH-Si-(OCH_2OCH_2CH_3)_3$ vinyltrimethoxyethoxysilane (VTMOEO)

and (3-(methacryloxy)propyl)trimethoxysilane $CH_2=C(CH_3)-CO-O-(CH_2)_3-Si(OCH_3)_3$.

The polyolefins can be grafted in the molten state in the presence of radical initiator(s).

The grafting reaction is carried out in a single- or twin-screw extruder fed with polyolefins in a feed hopper, for example in the form of granules; the polyolefins are melted by heating in a first region of the extruder and, in a second region, the reactants are introduced into the molten mass of the polyolefins.

The radical initiators can be chosen from peroxides, peracids, peresters or peracetals. They are generally used in the proportion of 0.01% to 0.5% by mass with respect to the polyolefins to be grafted.

Mention may be made, by way of example, of:

dicumyl peroxide (DICUP), 2,5-dimethyl-2,5-di(tert-butylperoxy)hexane (DHBP),

α,α'-(di-tert-butylperoxyisopropyl)benzene (Y1490),

It is preferable to dissolve the radical initiator in the liquid vinylalkoxysilane before introducing them, for example by means of a metering pump, into the polyolefins in the molten state.

It is preferable for the region for introduction of the reactants to be sufficiently long and at a sufficiently low temperature to ensure good dispersion of the reactants and the smallest possible thermal decomposition of the radical initiator.

The grafting reaction proper takes place in a third region of the extruder at a temperature capable of providing for complete decomposition of the radical initiator; before the exit of the molten mass at the extruder head, a degassing region is provided for where the decomposition products from the initiator and the unreacted vinylsilane are degassed, for example under vacuum.

The grafted polyolefins are recovered at the extruder outlet, for example in the form of granulated rods, after cooling under cold air.

The ratio by weight of the grafts to the grafted polymer is generally between 0.1 and 5% and preferably 0.15 to 2.5%.

The polyolefins which are grafted with unsaturated epoxides can be chosen from the same group as those which are grafted with unsaturated alkoxysilanes. Use is advantageously made of ethylene-alkyl (meth)acrylate copolymers.

Mention may be made, as examples of unsaturated epoxides, of in particular glycidyl esters and ethers, glycidyl itaconate, vinyl glycidyl ether, allyl glycidyl ether or vinylcyclohexene monoxide.

Mention may also be made of glycidyl alicyclic esters and ethers, such as 2-cyclohexen-1-yl glycidyl ether, diglycidyl cyclohexene-4,5-dicarboxylate, glycidyl cyclohexene-4-carboxylate, glycidyl 2-methyl-5-norbornene-2-carboxylate and diglycidyl endo-cis-bicyclo[2.2.1]hept-5-ene-2,3-dicarboxylate.

Preference is very particularly given, among these unsaturated epoxides, to glycidyl acrylate and methacrylate.

It is possible to use the same process as for grafting unsaturated alkoxysilanes for grafting unsaturated epoxides to the polyolefins.

As regards the third type of binder, namely copolymers of ethylene and of at least one unsaturated epoxide, the epoxide can be chosen from the same family as those already mentioned for the binders which are polyolefins grafted with unsaturated epoxides. This copolymer of ethylene and of at least one unsaturated epoxide can also comprise an alkyl (meth)acrylate or vinyl acetate. The alkyl (meth)acrylate can be chosen from the same family as mentioned above for the optional comonomers of polyolefins-grafted with unsaturated alkoxysilanes. Mention may be made, as examples of copolymers of ethylene and of at least one unsaturated epoxide, of copolymers of ethylene, of an alkyl (meth)acrylate and of glycidyl methacrylate containing, by weight, 2 to 10% and preferably 6 to 8% of glycidyl methacrylate and at least 50% of ethylene.

EXAMPLE 1

Two spools of PET film coated with silicon oxide were prepared, which were known as spool 1 and spool 2, the plasma-deposited silicon oxide layer being 200 ångstroms and the PET 12 microns.

Various binders were prepared which were either coextruded or heat-sealed on the films of the spools 1 and 2.

Composition of the binders:

a ethylene-methyl acrylate copolymer containing 29% of methyl acrylate and with a melt index under a load of 2.16 kg at 190° C.=3 dg/min;

b ethylene-butyl acrylate-maleic anhydride copolymer containing 3% of maleic anhydride and containing 15% of acrylate with a melt index of 5 dg/min;

c ethylene-methyl acrylate copolymer identical to a grafted to 0.45% by weight with vinyltrimethoxysilane.

The peel force of the binder/PET film coated with silicon oxide complexes was measured.

The results are combined in the following Table 1:

TABLE 1

| | Peel force at 180° C. | | | | |
|---|---|---|---|---|---|
| | in N/20 mm Coextruded th. of the binder: 10 μm | in N/25 mm Heat-sealed complexes th. of the binder: 350 μm | | in N/25 mm Heat-sealed complexes th. of the binder: 20 μm | |
| Binders | Spool ... | Spool 1 | Spool 2 | Spool 1 | Spool 2 |
| a ethylene/acrylate | — | <0.5 | 1 | <0.1 | <0.3 |
| b ethylene/acrylate/ maleic anhydride | 1.4 | 3 | — | 1 to 2 | 1 to 2 |
| c ethylene/ silane-grafted acrylate | — | 5 | 18* | 5 | 7* |

*tearing of the PET film.

EXAMPLE 2

Ethylene-methyl acrylate binders with the same composition as the binder a were prepared with different degrees of grafting of vinyltrimethoxysilane. The degree of grafting is by weight of graft with respect to the grafted polymer.

The binder/PET film coated with silicon oxide complex was prepared by heat sealing.

The thickness of the binder film is 350 μm.

The peel force was measured and the results appear in Table 2.

TABLE 2

| Degree of grafted silane | 0 | 0.06 | 0.1 | 0.2 | 0.25 | 0.3 | 0.45 |
|---|---|---|---|---|---|---|---|
| Peel force in N/25 mm at 180° C. | <0.5 | 0.5 | 1.8 | 3.5 | 3.3 | 4.5 | 5 |

We claim:

1. Material comprising a film covered with silicon oxide and a polyolefin film, wherein a binder arranged between the silicon oxide and the polyolefin film is selected from the group consisting of polyolefins grafted with unsaturated alkoxysilanes, polyolefins grafted with unsaturated epoxides, and copolymers of ethylene and of at least one unsaturated epoxide.

2. Material according to claim 1, wherein the binder is an ethylene-alkyl(meth)acrylate copolymer grafted by a compound selected from the group consisting of vinyltrialkyoxysilanes, allyltrialkoxysilanes, and (meth)acryloxyalkyltrialkoxysilanes.

3. Material according to claim 2, wherein the film covered with silicon oxide is made of poly(ethylene terephthalate)

and the polyolefin film comprises a polyolefin selected from the group consisting of polyethylene, polypropylene and copolymers of polyethylene.

4. Material according to claim 3, wherein the binder is an ethylene-alkyl (meth)acrylate copolymer grafted with a vinyltrialkoxysilanes.

5. Material according to claim 3, wherein the binder is an ethylene-alkyl (meth)acrylate-vinyltrialkoxysilanes copolymer.

6. Material according to claim 2, wherein the binder is an ethylene-alkyl (meth)acrylate copolymer grafted with a vinyltrialkoxysilanes.

7. Material according to claim 2, wherein the binder is an ethylene-alkyl (meth)acrylate-vinyltrialkoxysilanes copolymer.

8. Material according to claim 1, wherein the film covered with silicon oxide is made of poly(ethylene terephthalate) and the polyolefin film comprises a polyolefin selected from the group consisting of polyethylene, polypropylene and copolymers of polyethylene.

9. Material according to claim 8, wherein the binder is an ethylene-alkyl (meth)acrylate copolymer grafted with a glycidyl (meth)acrylate.

10. Material according to claim 8, wherein the binder is an ethylene-alkyl (meth)acrylate-glycidyl (meth)acrylate copolymer.

11. Material according to claim 1, wherein the binder is an ethylene-alkyl (meth)acrylate copolymer grafted with a glycidyl (meth)acrylate.

12. Material according to claim 1, wherein the binder is an ethylene-alkyl (meth)acrylate-glycidyl (meth)acrylate copolymer.

* * * * *